June 13, 1944.  H. E. BRELSFORD  2,351,101
LIQUID LEVEL INDICATOR
Filed March 9, 1942
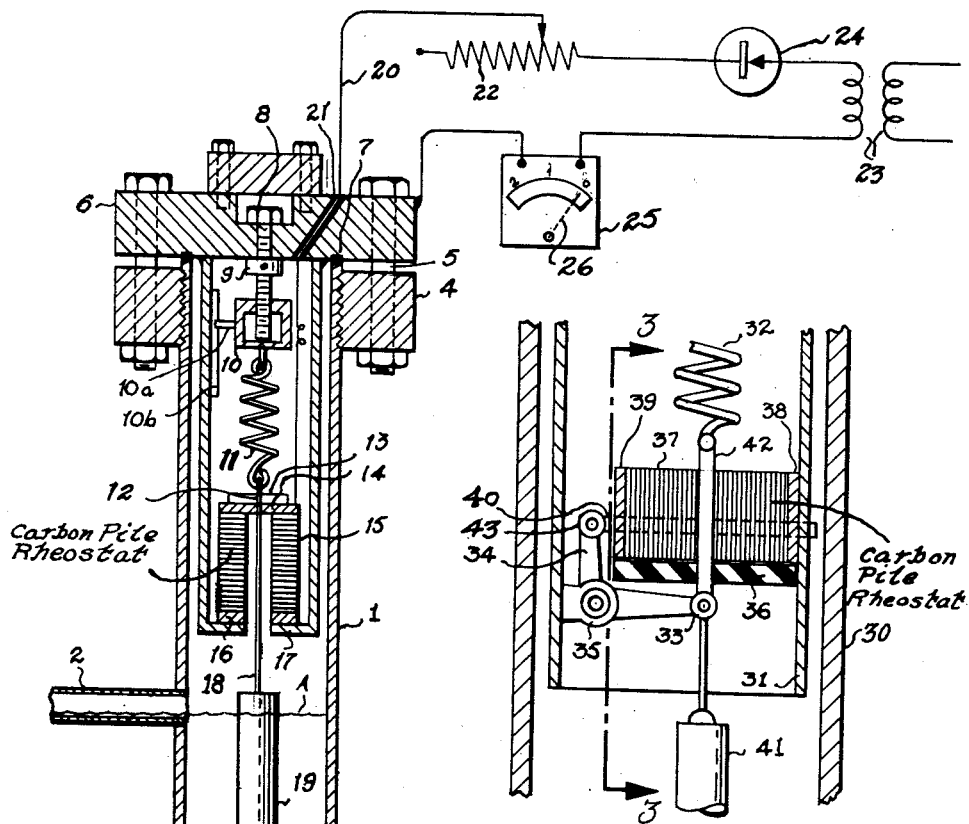
Fig. 2
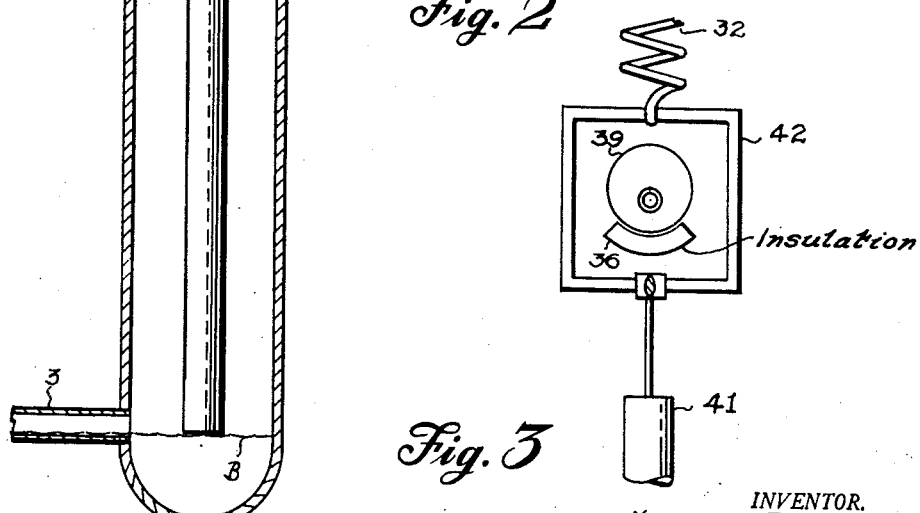
Fig. 3
Fig. 1
INVENTOR.
HARRY E. BRELSFORD
BY Patented June 13, 1944

2,351,101

UNITED STATES PATENT OFFICE 2,351,101

LIQUID LEVEL INDICATOR

Harry E. Brelsford, Birmingham, Mich., assignor to Diamond Power Specialty Corporation, Detroit, Mich., a corporation of Michigan Application March 9, 1942, Serial No. 433,952

2 Claims. (Cl. 73—313)

This invention relates to liquid level indicators and has for its object to provide an indicator particularly adaptable for use in connection with very high pressures such as might exceed the capabilities of gauge glasses.

In the case of certain installations, as for instance in the process of making ammonia, pressures of several thousand pounds per square inch are employed and it may be highly desirable to know the liquid level in the high pressure chamber. Under such conditions it is undesirable to have devices which require a packed joint where the operating mechanism passes from the interior to the exterior and it may be impractical to use a guage glass because of the danger in case of breakage. It is therefore the principal object of this invention to provide an indicator which will be entirely safe, which will be of simple construction and which has a motivating element entirely enclosed within the high pressure zone.

More specifically it is the object of this invention to provide an electrical indicator composed of an electric circuit and a dial hand to indicate the flow of current therein, the circuit containing a resistor which varies with the pressure to which it is subjected. This resistor is, of course, placed in the pressure chamber while the dial hand is outwardly thereof.

Other objects and advantages will become more fully apparent as reference is had to the accompanying drawing wherein my invention is illustrated, and in which Figure 1 illustrates my improved indicator and shows the resistor and high pressure chamber in longitudinal section with the electrical circuit to the resistor diagrammatically illustrated, Figure 2 is a fragmentary diametric section through a high pressure chamber showing a modified form of electrical current control, and Figure 3 is a vertical section taken along the line 3—3 of Figure 2.

More particularly, I indicates a high pressure chamber having the pipe lines 2 and 3 leading therefrom. The line 2 is intermediate the height of the chamber I so that the liquid level will always be between the two dotted lines A and B.

The pressure chamber I has a ring flange 4 screwed thereon. The nut has holes therethrough to receive a number of bolts 5 which hold a chamber head 6 thereagainst. The head 6 is preferably spaced from actual contact with the chamber I by an electrically insulating packing member 7.

Extending through the head 6 is a central bolt 8 which has a pinned collar 9 screwed up lightly against the interior of the head 6 and on the outer threaded end of the bolt is a nut 10 from which depends a spring 11. Nut 10 is restrained from rotating by arm 10a which engages an abutment 10b on the sidewall of the chamber I. A short non-conductor link 12 connects the bottom of this spring with a plate 13 which is secured to a second plate 14 of metal. The plate 14 rests directly on a series of discs 15, made of carbon, graphite or similar material, and these discs, in turn, rest upon a bottom plate 16. The bottom plate is supported by an open bottomed cage 17 secured, as by welding, to the head 6. An extension 18 of the link 12 extends freely through the plate 14, carbon pile 15, plate 16 and the bottom of the cage 17.

Secured to the bottom of the link 18 is a bar 19 which is preferably made of some heavy metal which will not corrode under the conditions under which it exists in the chamber.

One electric lead line 20 has its terminal at the plate 14 and extends through an insulating packing 21 in the head 6 from where it leads to a variable resistance 22. This resistance is connected to a source of electrical energy from a transformer 23 through a rectifier 24, preferably of the copper oxide type, which will convert low voltage alternating current to direct current. The other side of the transformer 23 is connected through an ammeter 25 to the head 6.

The operation is as follows: it is known that, within certain limits, carbon and graphite offer a resistance to the passage of an electric current proportional to the compression imposed thereon. For example, in the case of rather loosely packed carbon discs, as here contemplated, the resistance will vary almost directly in proportion to the degree of compression for weights up to about six pounds. Advantage is taken of this phenomenon, coupled with the further phenomenon that a body will lose weight equal to the weight of liquid it displaces as it is undergoing immersion therein.

The chamber I contains a liquid level which may be anywhere between the lines A and B. The rod 19 extends practically the entire length of this zone. When the liquid level is at B the rod 19 exerts its weight on the carbon or graphite pile 15 thus permitting maximum current flow through the circuit 23, 24, 22, 20, 14, 15, 16, 17, 6 and 25. This maximum flow will be indicated by the hand 26 of the ammeter as it will swing to its maximum position. The operator will thus be informed that there is no liquid in this chamber. As liquid is admitted into the chamber I the weight of the element 19 decreases by an amount equal to the weight of the liquid displaced. The reduction in weight of this element reduces the amount of compression on the carbon and increases the resistance to current flow. The amount of the reduction of current flow will be reflected on the ammeter dial. The reduction will continue until the liquid has reached its upper level A whereupon the current flow will be at a minimum.

It will be noted that the spring 11 supports a portion of the weight of the element 19. The proportion of the weight supported by the spring may be altered by rotation of the nut 10 on the threads of the bolt 8.

In Figures 2 and 3 a pressure chamber 30 corresponds to the chamber 1 and the tube 31 corresponds to the tube 17. The spring 32 corresponds to the spring 11. Depending from the spring 32 is a link in the form of a yoke 42 having its lower end connected to the outer end 33 of a bellcrank 34 pivotally mounted on a bracket 35. The bracket 35 is carried by the tube 31. Diametrically opposite the bracket 35 a support 36 of electrically insulating material is secured in the sidewall of the tube 31. The support 36 supports the pile of carbon or carbonaceous-like material 37, the pile being contained between the end plates 38 and 39. A rod 40 is secured to one end plate 39 and is movable relative to the carbon pile 37, the plate 38 and the wall of the tube 31.

The end 33 of the bell crank 34 carries the weight 41, assisted by the spring 32 and causes the other end 43 to press against the plate 39 and the carbon pile 37. The bell-crank arm 43 is pivotally connected to the end of the rod 40.

The advantage of this type is that the carbon pile is not subjected to continuous pressure by the weight of the plate 39.

Various modifications may be made to accommodate the device to the various fields in which it will find utility and for the various uses in each field so that I desire to be extended protection within the scope of the following claims.

What I claim is:

1. A liquid level indicator for a liquid containing chamber comprising a multiplicity of flat disc-like elements arranged in side by side vertical relation, an electric circuit in which said pile is incorporated, a weight in said chamber extending in length substantially from the highest to the lowest possible liquid levels therein, a yoke encompassing said elements in a vertical direction, said weight being suspended from said yoke, a spring also secured to said yoke for sustaining a selected proportion of the weight of said weight and yoke, and a bell crank pivotally mounted on a wall of said chamber, one end of said bell crank being pivotally connected to said yoke and the other end thereof being arranged to impose pressure in a horizontal direction on said elements.

2. A liquid level indicator for a pressure chamber comprising a pile of comparatively loosely packed carbonaceous-like material placed in the chamber above the highest liquid level, said pile being composed of a plurality of flat disc-like elements positioned in side by side vertical relation whereby relief of loading permits expansion of said material, an electric circuit in which said pile is incorporated, a weight in said chamber extending in length substantially from the highest to the lowest possible liquid levels therein, a spring sustaining said weight, means positioned between said weight and said spring reacting against a wall of said chamber and acting on said weight to transfer a portion of said weight to said pile when acting to relieve substantially all loading on said pile when said weight is fully immersed whereby said carbonaceous-like material expands, and means indicating the current flow in said circuit.

HARRY E. BRELSFORD.